United States Patent [19]
Yakel

[11] Patent Number: 5,641,525
[45] Date of Patent: Jun. 24, 1997

[54] RESIN TRANSFER MOLDING APPARATUS

[75] Inventor: Dale S. Yakel, Waukesha, Wis.

[73] Assignee: Outboard Marine Corporation, Waukegan, Ill.

[21] Appl. No.: 526,568

[22] Filed: Sep. 11, 1995

[51] Int. Cl.$^6$ .............. B29C 70/44; B29C 70/54
[52] U.S. Cl. .......... 425/390; 264/313; 264/571; 425/389; 425/DIG. 44
[58] Field of Search ............... 425/112, 389, 425/390, 405.1, DIG. 44; 264/257, 258, 313, 316, 510, 571

[56] References Cited

U.S. PATENT DOCUMENTS

| | | | |
|---|---|---|---|
| 3,492,392 | 1/1970 | Kasamatsu et al. | 264/257 |
| 4,732,639 | 3/1988 | Newsom | 425/389 |
| 4,822,436 | 4/1989 | Callis et al. | 156/211 |
| 4,824,631 | 4/1989 | Yeager | 264/313 |
| 5,128,090 | 7/1992 | Fujii et al. | 264/257 |
| 5,217,669 | 6/1993 | Dublinski et al. | 264/258 |
| 5,286,438 | 2/1994 | Dublinski et al. | 264/257 |
| 5,292,475 | 3/1994 | Mead et al. | 264/257 |
| 5,462,702 | 10/1995 | Slaughter, Jr. | 264/313 |

FOREIGN PATENT DOCUMENTS

| | | | |
|---|---|---|---|
| 3439285 | 8/1985 | Germany . | |
| 2184053 | 6/1987 | United Kingdom | 425/405.1 |
| 2243104 | 10/1991 | United Kingdom | 264/257 |
| WO85/01472 | 5/1985 | WIPO | B29D 3/00 |

Primary Examiner—Robert Davis
Attorney, Agent, or Firm—Jones, Day, Reavis & Pogue

[57] ABSTRACT

Disclosed herein is a resin transfer molding apparatus including a female mold member having a rigid surface including a main surface portion, and a recessed surface portion extending inwardly from and bordered by the main portion to define a recessed area, and a male mold member including a structure which is adapted to be drawn into close association with the rigid surface of the female mold member in response to the application of vacuum therebetween and which includes a member which is at least partially flexible and which includes an inner surface located, during the application of vacuum, in relatively adjacent opposing relation to the main surface portion of the female mold member and in relatively spaced relation to the recessed surface portion, and a segment which is relatively rigid, which has a shape conforming to the recessed area, which is fixedly bonded to the inside surface of the member, and which is located, during the application of vacuum, in relatively adjacent opposing relation to the recessed surface portion of the female mold member.

3 Claims, 1 Drawing Sheet

1

RESIN TRANSFER MOLDING APPARATUS

BACKGROUND OF THE INVENTION

The invention relates generally to resin transfer molding and, more particularly, to molding apparatus for such resin transfer molding. The invention also relates more particularly to methods of fabricating resin transfer molding apparatus.

In the past, when a female mold member included a recess which was sufficiently small or sharp, the flexible bag was sometimes unable to enter into the recess in close association with the recess and, as a consequence, in molded articles including such a recess, the article included excessive amounts of the resin in the recessed area. One example of such a recess which produced excessive amounts of resin in the molded article is the recess which produces a chine or strake on the outer surface of a boat hull.

Such articles with excessive amounts of resin were not as economically manufactured as they might be.

Attention is directed to U.S. Pat. 4,822,436 (issued Apr. 18, 1989), as well as PCT Application WO 85/01472 (International Publication date: 11 Apr. 1985) and German Application 34 39 285 (Issued 22 Aug. 1985).

SUMMARY OF THE INVENTION

The invention provides a resin transfer molding apparatus comprising a female mold member including a rigid surface including a main surface portion, and a recessed surface portion extending inwardly from and bordered by the main portion to define a recessed area, and a male mold member including a structure which is adapted to be drawn into close association with the rigid surface of the female mold member in response to the application of vacuum therebetween and which includes a member which is at least partially flexible and which includes an inner surface located, during the application of vacuum, in relatively adjacent opposing relation to the main surface portion of the female mold member and in relatively spaced relation to the recessed surface portion, and a segment which is relatively rigid, which has a shape conforming to the recessed area, which is fixedly bonded to the inside surface of the member, and which is located, during the application of vacuum, in relatively adjacent opposing relation to the recessed surface portion of the female mold member.

The invention also provides a method of making a resin transfer molding apparatus comprising the steps of fabricating a female mold member including a rigid surface having a recessed area, applying a releasing agent to the rigid surface of the female mold member, filling the recessed area with a curable two-part silicone plastic material which is rigid when cured, placing a flexible silicone bag adjacent the rigid surface of the female mold member and the plastic material in the recessed area, and drawing and maintaining a vacuum between the flexible bag and the rigid surface of the female mold member so as to locate the flexible bag in close association with the rigid surface of the female mold member and in contact with the plastic material, and curing the plastic material in the recessed area during the maintenance of the vacuum so as to rigidify the plastic material and to adhere the plastic material to the silicone bag.

Other features and advantages of the invention will become apparent to those skilled in the art upon review of the following detailed description, claims and drawings.

Figure 1:
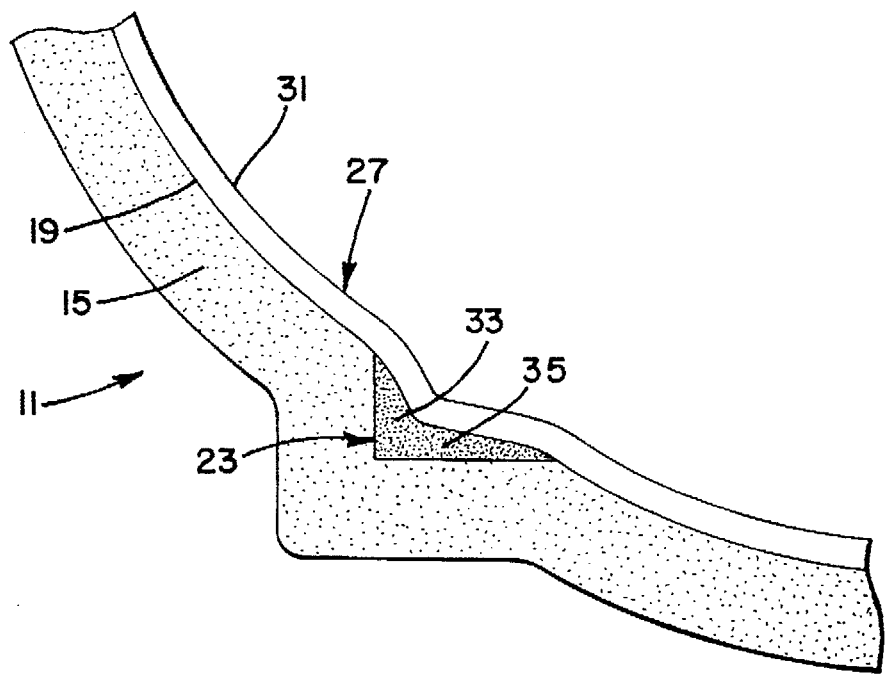
FIG. 1 is a fragmentary sectional view of a resin transfer molding apparatus in accordance with one embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is a resin transfer molding apparatus 11 comprising a female mold member 15 including a rigid surface 19 including a recess or recessed area 23, and a male mold member 27 including a structure or bag 31 which can be flexible or semi-rigid and which is adapted to be drawn into close association with the rigid surface 19 of the female mold member 15 in response to the application of vacuum therebetween and which includes an area of increased thickness or an enlargement 35 which has a shape conforming to the shape of the recess or recessed area 23 in the rigid surface 19 of the female mold member 15.

While many other applications exist, in the disclosed construction, the molding apparatus 11 is adapted for molding a boat hull (not fully shown) including a chine or strake which extends for a substantial length along the boat hull and which, in general, projects outwardly from the general lines of the boat hull. As a consequence, the recess 23 in the female mold member 15 is in the shape of a chine and is defined by surfaces which define a relatively sharp recess. Any suitable female mold member construction can be employed.

The structure or bag 31 can be constructed in any suitable manner, can, as already noted, be either flexible or semi-rigid, i.e., partially flexible, and, while other constructions can be employed, in the disclosed construction, the stricture or bag 31 is a relatively thin walled and generally flexible bag constructed of silicone. The bag 31 can include a dart or other projecting shape 33 which extends partially into the recess 23 in spaced relation to the surfaces thereof. If desired, the bag 31 can curvilinearly extend past the recess 23 without partially extending thereinto.

The enlargement(s) or increased thickness area(s) 35 can be fabricated of various filler materials and in the disclosed construction, the increased thickness area 35 is fabricated of a curable material which, when cured, is rigid, and is fixedly bonded to the flexible bag. While other materials can be employed, in the disclosed construction, the area 35 of increased thickness is preferably fabricated from a curable plastic material, such as a two-part silicone mixture consisting of a resin and a hardener. Any suitable two-part silicone mixture can be employed.

The resin transfer molding apparatus 11 is fabricated by a method including the steps of fabricating the female mold member 15 including the rigid surface 19 having therein the recessed area 23, applying a releasing agent to at least the recessed area 23 of the rigid surface 19 of the female mold member 15, filling the recessed area 23 with a filler material, locating a structure which can be in the form of a flexible bag 31 in close association with the rigid surface 19 of the female mold member 15 and with the filler material in the recessed area 23, and solidifying the material in the recessed area 23 and adhering the material to the flexible bag 31.

Any suitable releasing agent capable of preventing adhesion of the curable plastic material to the rigid surface 19 of the female mold member 15 can be employed. In the preferred construction, the releasing agent is applied to the entire surface 19 of the female mold member 15.

The step of filling the recessed area 23 with filler material can be performed in any suitable manner.

In one embodiment of the invention, the locating step includes the step of placing the flexible bag 31 adjacent the rigid surface 19 of the female mold member 15 and the filler material, sealing the perimeter of the bag 31 to the female mold member, and drawing and maintaining a vacuum between the flexible bag 31 and the rigid surface 19 of the female mold member 15 so as to locate the flexible bag 31 in generally evenly spaced relation to, and close association with, the rigid surface 19 of the female mold member 15 and in contact with the filler material.

The steps of placing the flexible bag 31 in the female mold member 15 and sealing the flexible bag 31 to the female mold member 15, thereby to facilitate drawing a vacuum between the flexible bag 31 and the female mold member 15, can be accomplished in any suitable manner.

Any suitable arrangement can be employed for drawing or creating and maintaining a vacuum between the female mold member 15 and the flexible bag 31.

In one embodiment of the invention, the filler material is preferably a curable plastic material, such as a two-part silicone plastic, and any suitable arrangement can be employed for curing or solidifying the plastic material and for effectively bonding or adhering the plastic material to the flexible bag 31. The curing step is completed during maintenance of the vacuum, i.e., before termination of the vacuum.

When employing the resulting resin transfer molding apparatus 11 in the molding of an article, such as a boat hull, upon the application of vacuum, the enlargement or increased thickness area 35 of the flexible bag 31 extends into the recess 23 in close association to the rigid surface 19 of the female mold member 15 and prevents accumulation of excessive amounts of resin in the recess. The method is particularly applicable to the resin transfer molding of boat hulls provided with chines and/or strakes. Because the enlargement or area of increased thickness is fabricated in the recess 23 of the female mold member 15, the enlargement or increased thickness area 35 has the shape of the recess 23 which, in the case of the disclosed boat hull, is the shape of a chine.

Various of the features are set forth in the following claims.

I claim:

1. A resin transfer molding apparatus comprising a female mold member including a rigid surface including a main surface portion, and a recessed surface portion extending inwardly from and bordered by said main portion to define a recessed area, and a male mold member including a structure which is adapted to be drawn into close association with said rigid surface of said female mold member in response to the application of vacuum therebetween and which includes a member which is at least partially flexible and which includes an inner surface located, during the application of vacuum, in relatively adjacent opposing relation to said main surface portion of said female mold member and in relatively spaced relation to said recessed surface portion, and a segment which is relatively rigid, which has a shape conforming to said recessed area, which is fixedly bonded to said inside surface of said member, and which is located, during the application of vacuum, in relatively adjacent opposing relation to said recessed surface portion of said female mold member.

2. A resin transfer molding apparatus in accordance with claim 1 wherein said member is a flexible bag fabricated of silicone, and wherein said segment is fabricated from a two-part silicone mixture.

3. A resin transfer molding apparatus in accordance with claim 1 wherein said member is semi-flexible, and wherein said segment is fabricated from a two-part silicone mixture.

* * * * *